United States Patent
Kimura

(10) Patent No.: US 11,475,584 B2
(45) Date of Patent: Oct. 18, 2022

(54) BAFFLES FOR THREE-DIMENSIONAL SENSORS HAVING SPHERICAL FIELDS OF VIEW

(71) Applicant: Magik Eye Inc., New York, NY (US)

(72) Inventor: Akiteru Kimura, Hachioji (JP)

(73) Assignee: Magik Eye Inc., New York, NY (US)

( * ) Notice: Subject to any disclaimer, the term of this patent is extended or adjusted under 35 U.S.C. 154(b) by 592 days.

(21) Appl. No.: 16/523,637

(22) Filed: Jul. 26, 2019

(65) Prior Publication Data

US 2020/0051268 A1 Feb. 13, 2020

Related U.S. Application Data

(60) Provisional application No. 62/715,482, filed on Aug. 7, 2018.

(51) Int. Cl.
*G06K 9/00* (2022.01)
*G06T 7/586* (2017.01)
(Continued)

(52) U.S. Cl.
CPC ............. *G06T 7/586* (2017.01); *G01N 21/35* (2013.01); *G01N 2021/8816* (2013.01); *G01N 2021/8877* (2013.01)

(58) Field of Classification Search
CPC .............. G06T 7/586; G06T 7/521; G06T 2207/10028; G01N 21/35; G01N 2021/8816; G01N 2021/8877; G01B 11/2513; G01B 11/026; G01B 11/25; G01B 11/2518; H04N 9/3161; H04N 13/32; G06K 7/10732; G06K 7/10594; G06V 10/141;

(Continued)

(56) References Cited

U.S. PATENT DOCUMENTS 4,914,460 A   4/1990   Caimi et al.
5,699,444 A   12/1997  Palm
(Continued)

FOREIGN PATENT DOCUMENTS

CN   101794065 A   8/2010
CN   103196385 A   7/2013
(Continued)

OTHER PUBLICATIONS

International Search Report and Written Opinion mailed in corresponding PCT/US2019/043702, dated Nov. 14, 2019, 13 pages.

*Primary Examiner* — Shervin K Nakhjavan
(74) *Attorney, Agent, or Firm* — Tong, Rea, Bentley & Kim, LLC

(57) ABSTRACT

In one example, a distance sensor includes a camera to capture images of a field of view, a plurality of light sources arranged around a lens of the camera, wherein each light source of the plurality of light sources is configured to project a plurality of beams of light into the field of view, and wherein the plurality of beams of light creates a pattern of projection artifacts in the field of view that is visible to a detector of the camera, a baffle attached to a first light source of the plurality of light sources, wherein the baffle is positioned to limit a fan angle of a plurality of beams of light that is projected by the first light source, and a processing system to calculate a distance from the distance sensor to an object in the field of view, based on an analysis of the images.

20 Claims, 7 Drawing Sheets

(51) Int. Cl.
*G01N 21/35* (2014.01)
*G01N 21/88* (2006.01)

(58) Field of Classification Search
CPC . G03B 21/2013; G03B 21/2033; G03B 17/54
See application file for complete search history.

(56) References Cited

U.S. PATENT DOCUMENTS

| | | | |
|---|---|---|---|
| 5,730,702 A | 3/1998 | Tanaka et al. | |
| 5,870,136 A | 2/1999 | Fuchs et al. | |
| 5,980,454 A | 11/1999 | Broome | |
| 6,038,415 A | 3/2000 | Nishi et al. | |
| 6,442,476 B1 | 8/2002 | Poropat | |
| 6,668,082 B1 | 12/2003 | Davison et al. | |
| 6,937,350 B2 | 8/2005 | Shirley | |
| 7,191,056 B2 | 3/2007 | Costello et al. | |
| 7,193,645 B1 | 3/2007 | Aagaard et al. | |
| 7,375,803 B1 | 5/2008 | Bamji | |
| 7,589,825 B2 | 9/2009 | Orchard et al. | |
| 9,098,909 B2 | 8/2015 | Nomura | |
| 9,488,757 B2 | 11/2016 | Mukawa | |
| 9,536,339 B1 | 1/2017 | Worley et al. | |
| 9,686,539 B1 | 6/2017 | Zuliani et al. | |
| 9,888,225 B2 | 2/2018 | Znamensky et al. | |
| 9,986,208 B2 | 5/2018 | Chao et al. | |
| 2003/0071891 A1 | 4/2003 | Geng | |
| 2004/0167744 A1 | 8/2004 | Lin et al. | |
| 2004/0246473 A1* | 12/2004 | Hermary | G01B 11/245 356/237.1 |
| 2006/0044546 A1 | 3/2006 | Lewin et al. | |
| 2006/0055942 A1 | 3/2006 | Krattiger | |
| 2006/0290781 A1* | 12/2006 | Hama | G01C 3/08 348/135 |
| 2007/0091174 A1 | 4/2007 | Kochi et al. | |
| 2007/0165243 A1 | 7/2007 | Kang et al. | |
| 2007/0206099 A1* | 9/2007 | Matsuo | G06V 40/10 348/E5.029 |
| 2010/0007719 A1 | 1/2010 | Frey et al. | |
| 2010/0149315 A1 | 6/2010 | Qu et al. | |
| 2010/0223706 A1 | 9/2010 | Becker et al. | |
| 2010/0238416 A1 | 9/2010 | Kuwata | |
| 2011/0037849 A1 | 2/2011 | Niclass et al. | |
| 2011/0188054 A1 | 8/2011 | Petronius et al. | |
| 2012/0051588 A1 | 3/2012 | Mceldowney | |
| 2012/0056982 A1 | 3/2012 | Katz et al. | |
| 2012/0062758 A1 | 3/2012 | Devine et al. | |
| 2012/0113252 A1 | 5/2012 | Yang et al. | |
| 2012/0219699 A1 | 8/2012 | Pettersson | |
| 2012/0225718 A1* | 9/2012 | Zhang | A63F 13/52 463/31 |
| 2012/0236317 A1 | 9/2012 | Nomura | |
| 2013/0076865 A1 | 3/2013 | Tateno et al. | |
| 2013/0088575 A1 | 4/2013 | Park et al. | |
| 2013/0155417 A1 | 6/2013 | Ohsawa | |
| 2013/0242090 A1 | 9/2013 | Yoshikawa | |
| 2013/0307933 A1 | 11/2013 | Znamensky et al. | |
| 2013/0314688 A1 | 11/2013 | Likholyot | |
| 2014/0000020 A1 | 1/2014 | Bareket | |
| 2014/0009571 A1 | 1/2014 | Geng | |
| 2014/0016113 A1 | 1/2014 | Holt et al. | |
| 2014/0036096 A1 | 2/2014 | Sterngren | |
| 2014/0071239 A1 | 3/2014 | Yokota | |
| 2014/0085429 A1 | 3/2014 | Hérbert | |
| 2014/0125813 A1* | 5/2014 | Holz | G06V 10/141 348/169 |
| 2014/0207326 A1* | 7/2014 | Murphy | G05D 1/0236 701/28 |
| 2014/0241614 A1 | 8/2014 | Lee | |
| 2014/0275986 A1 | 9/2014 | Vertikov | |
| 2014/0320605 A1 | 10/2014 | Johnson | |
| 2015/0009301 A1 | 1/2015 | Ribnick et al. | |
| 2015/0012244 A1 | 1/2015 | Oki | |
| 2015/0062558 A1 | 3/2015 | Koppal et al. | |
| 2015/0077764 A1 | 3/2015 | Braker et al. | |
| 2015/0131054 A1 | 5/2015 | Wuellner et al. | |
| 2015/0016003 A1 | 6/2015 | Terry et al. | |
| 2015/0171236 A1 | 6/2015 | Murray | |
| 2015/0248796 A1 | 9/2015 | Iyer et al. | |
| 2015/0268399 A1 | 9/2015 | Futterer | |
| 2015/0288956 A1 | 10/2015 | Mallet et al. | |
| 2015/0323321 A1 | 11/2015 | Oumi | |
| 2015/0336013 A1 | 11/2015 | Stenzier et al. | |
| 2015/0381907 A1 | 12/2015 | Boetliger et al. | |
| 2016/0022374 A1 | 1/2016 | Haider | |
| 2016/0041266 A1 | 2/2016 | Smits | |
| 2016/0117561 A1* | 4/2016 | Miyazawa | G01B 11/026 348/169 |
| 2016/0128553 A1 | 5/2016 | Geng | |
| 2016/0157725 A1 | 6/2016 | Munoz | |
| 2016/0178915 A1 | 6/2016 | Mor et al. | |
| 2016/0249810 A1 | 9/2016 | Darty et al. | |
| 2016/0261854 A1* | 9/2016 | Ryu | H04N 13/232 |
| 2016/0267682 A1 | 9/2016 | Yamashita | |
| 2016/0288330 A1 | 10/2016 | Konolige | |
| 2016/0327385 A1 | 11/2016 | Kimura | |
| 2016/0328854 A1* | 11/2016 | Kimura | G01B 11/026 |
| 2016/0334939 A1 | 11/2016 | Dawson et al. | |
| 2016/0350594 A1 | 12/2016 | McDonald | |
| 2016/0379368 A1 | 12/2016 | Sakas et al. | |
| 2017/0098305 A1 | 4/2017 | Gossow | |
| 2017/0102461 A1 | 4/2017 | Tezuka et al. | |
| 2017/0221226 A1 | 8/2017 | Shen et al. | |
| 2017/0270689 A1 | 9/2017 | Messely et al. | |
| 2017/0284799 A1 | 10/2017 | Wexler et al. | |
| 2017/0307544 A1* | 10/2017 | Nagata | G01N 21/95 |
| 2017/0347086 A1 | 11/2017 | Watanabe | |
| 2018/0010903 A1 | 1/2018 | Takao et al. | |
| 2018/0011194 A1 | 1/2018 | Masuda et al. | |
| 2018/0073863 A1 | 3/2018 | Watanabe | |
| 2018/0080761 A1 | 3/2018 | Takao et al. | |
| 2018/0143018 A1 | 5/2018 | Kimura | |
| 2018/0156609 A1 | 6/2018 | Kimura | |
| 2018/0227566 A1 | 8/2018 | Price et al. | |
| 2018/0249142 A1 | 8/2018 | Hicks et al. | |
| 2018/0324405 A1 | 11/2018 | Thirion | |
| 2018/0329038 A1 | 11/2018 | Lin et al. | |
| 2018/0357871 A1 | 12/2018 | Siminoff | |
| 2019/0064359 A1 | 2/2019 | Yang | |
| 2019/0107387 A1 | 4/2019 | Kimura | |
| 2019/0108743 A1 | 4/2019 | Kimura | |
| 2019/0122057 A1 | 4/2019 | Kimura | |
| 2019/0295270 A1 | 9/2019 | Kimura | |
| 2019/0297241 A1 | 9/2019 | Kimura | |
| 2019/0377088 A1 | 12/2019 | Kimura | |
| 2020/0003556 A1 | 1/2020 | Kimura | |
| 2020/0182974 A1 | 6/2020 | Kimura | |
| 2020/0236315 A1 | 7/2020 | Kimura | |
| 2021/0190483 A1* | 6/2021 | Ilg | G01B 11/005 |

FOREIGN PATENT DOCUMENTS

| | | |
|---|---|---|
| CN | 103559735 A | 2/2014 |
| CN | 104160243 A | 11/2014 |
| CN | 104515514 A | 4/2015 |
| EP | 0358628 A2 | 3/1990 |
| JP | H045112 A | 2/1992 |
| JP | H0961126 A | 3/1997 |
| JP | 2006-313116 A | 11/2006 |
| JP | 2007-10346 A | 1/2007 |
| JP | 2007-187581 A | 7/2007 |
| JP | 2007-315864 A | 12/2007 |
| JP | 2010-091855 A | 4/2010 |
| JP | 2010-101683 A | 5/2010 |
| JP | 4485365 B2 | 6/2010 |
| JP | 2010-256182 A | 11/2010 |
| JP | 2012-047500 A | 3/2012 |
| JP | 2014-020978 A | 2/2014 |
| JP | 2014-511590 A | 5/2014 |
| JP | 2014-122789 A | 7/2014 |
| JP | 6038415 B1 | 12/2016 |
| JP | 6241793 B2 | 12/2017 |
| KR | 10-2013-0000356 A | 1/2013 |
| KR | 10-2013-0037152 A | 4/2013 |

(56) References Cited

FOREIGN PATENT DOCUMENTS

| | | |
|---|---|---|
| KR | 10-2015-0101749 A | 9/2015 |
| KR | 10-2016-0020323 | 2/2016 |
| KR | 10-2017-0005649 A | 1/2017 |
| KR | 10-2017-0054221 A | 5/2017 |
| KR | 10-2017-0094968 | 8/2017 |
| TW | I320480 B | 2/2010 |
| TW | I451129 B | 4/2012 |
| WO | WO 2012/081506 A1 | 6/2012 |
| WO | WO/2013/145164 | 10/2013 |
| WO | WO 2014/0106843 A2 | 7/2014 |
| WO | WO 2014/131064 | 8/2014 |
| WO | WO 2015/166915 A1 | 11/2015 |

* cited by examiner

BAFFLES FOR THREE-DIMENSIONAL SENSORS HAVING SPHERICAL FIELDS OF VIEW

CROSS REFERENCE TO RELATED APPLICATIONS

This application claims the priority of U.S. Provisional Patent Application Ser. No. 62/715,482, filed Aug. 7, 2018, which is herein incorporated by reference in its entirety.

BACKGROUND

U.S. patent applications Ser. Nos. 14/920,246, 15/149,323, and 15/149,429 describe various configurations of distance sensors. Such distance sensors may be useful in a variety of applications, including security, gaming, control of unmanned vehicles, operation of robotic or autonomous appliances (e.g., vacuum cleaners), and other applications.

The distance sensors described in these applications include projection systems (e.g., comprising lasers, diffractive optical elements, and/or other cooperating components) which project beams of light in a wavelength that is substantially invisible to the human eye (e.g., infrared) into a field of view. The beams of light spread out to create a pattern (of dots, dashes, or other artifacts) that can be detected by an appropriate light receiving system (e.g., lens, image capturing device, and/or other components). When the pattern is incident upon an object in the field of view, the distance from the sensor to the object can be calculated based on the appearance of the pattern (e.g., the positional relationships of the dots, dashes, or other artifacts) in one or more images of the field of view, which may be captured by the sensor's light receiving system. The shape and dimensions of the object can also be determined.

For instance, the appearance of the pattern may change with the distance to the object. As an example, if the pattern comprises a pattern of dots, the dots may appear closer to each other when the object is closer to the sensor, and may appear further away from each other when the object is further away from the sensor.

SUMMARY

In one example, a distance sensor includes a camera to capture images of a field of view, a plurality of light sources arranged around a lens of the camera, wherein each light source of the plurality of light sources is configured to project a plurality of beams of light into the field of view, and wherein the plurality of beams of light creates a pattern of projection artifacts in the field of view that is visible to a detector of the camera, a baffle attached to a first light source of the plurality of light sources, wherein the baffle is positioned to limit a fan angle of a plurality of beams of light that is projected by the first light source, and a processing system to calculate a distance from the distance sensor to an object in the field of view, based on an analysis of the images.

In another example, a method performed by a processing system of a distance sensor includes instructing a first pair of light sources of the distance sensor to project a first pattern of light into a field of view, wherein the first pattern of light is created when each light source of the first pair of light sources projects a plurality of beams of light, and wherein at least one light source of the first pair of light sources includes a first baffle to limit a fan angle of the plurality of beams of light, instructing a camera of the distance sensor to acquire a first image of the field of view, wherein the first image includes the first pattern of light, instructing a second pair of light sources of the distance sensor to project a second pattern of light into the field of view, wherein the second pattern of light is created when each light source of the second pair of light sources projects a plurality of beams of light, and wherein at least one light source of the second pair of light sources includes a second baffle to limit a fan angle of the plurality of beams of light, instructing the camera to acquire a second image of the field of view, wherein the second image includes the second pattern of light, and calculating a distance from the distance sensor to an object in the field of view, based on appearances of the first pattern of light and the second pattern of light in the first image and the second image.

In another example, a non-transitory machine-readable storage medium is encoded with instructions executable by a processor. When executed, the instructions cause the processor to perform operations including instructing a first pair of light sources of the distance sensor to project a first pattern of light into a field of view, wherein the first pattern of light is created when each light source of the first pair of light sources projects a plurality of beams of light, and wherein at least one light source of the first pair of light sources includes a first baffle to limit a fan angle of the plurality of beams of light, instructing a camera of the distance sensor to acquire a first image of the field of view, wherein the first image includes the first pattern of light, instructing a second pair of light sources of the distance sensor to project a second pattern of light into the field of view, wherein the second pattern of light is created when each light source of the second pair of light sources projects a plurality of beams of light, and wherein at least one light source of the second pair of light sources includes a second baffle to limit a fan angle of the plurality of beams of light, instructing the camera to acquire a second image of the field of view, wherein the second image includes the second pattern of light, and calculating a distance from the distance sensor to an object in the field of view, based on appearances of the first pattern of light and the second pattern of light in the first image and the second image.

DETAILED DESCRIPTION

The present disclosure broadly describes baffles for three-dimensional sensors having spherical fields of view. As discussed above, distance sensors such as those described in U.S. patent applications Ser. Nos. 14/920,246, 15/149,323, and 15/149,429 determine the distance to an object (and, potentially, the shape and dimensions of the object) by projecting beams of light that spread out to create a pattern (e.g., of dots, dashes, or other artifacts) in a field of view that includes the object. The beams of light may be projected from one or more laser light sources which emit light of a wavelength that is substantially invisible to the human eye, but which is visible to an appropriate detector (e.g., of the light receiving system). The three-dimensional distance to the object may then be calculated based on the appearance of the pattern to the detector.

Figure 1:
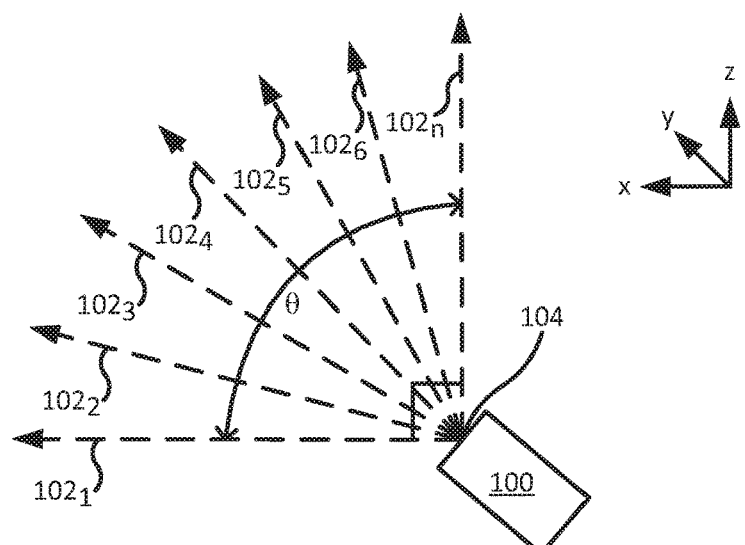
FIG. 1 illustrates one example of a laser light source that may be used in a distance sensor.

FIG. 1 illustrates one example of a laser light source 100 that may be used in a distance sensor such as any of the sensors described above. As illustrated the laser light source may project a plurality of beams $102_1$-$102_n$ of light (hereinafter individually referred to as a "beam 102" or collectively referred to as "beams 102"). When each beam 102 is incident upon an object, it may create an artifact such as a dot, a dash, or the like on the object. Collectively, the artifacts created by all of the beams 102 form the above-described pattern from which the distance to the object can be calculated.

As shown in FIG. 1, the beams 102 may fan out from a single point 104 on the laser light source 100. For instance, the laser light source 100 may include a diffractive optical element such as a mirror or a holographic film that may split a single beam of light emitted by the laser light source 100 into the plurality of beams 102 that fan out as shown (where the single point 104 may represent the diffractive optical element). In one example, the fan angle θ of the beams 102 is approximately ninety degrees. That is, the beams 102 may spread out in a "fan" shape that covers up to approximately ninety degrees in a rectangular (i.e., x,y,z) coordinate system as shown. In some cases, the fan angle θ may be even greater than ninety degrees.

FIG. 1 illustrates the fan of the beams 102 between the x and z axes of the illustrated coordinate axis; however, it will be appreciated that the beams 102 may also fan out between the y and z axes and between the x and y axes, and that the fans angles between these axes may also be up to approximately ninety degrees. Thus, the total coverage area of the plurality of beams 102 may be approximately equal to one quarter or quadrant of a hemisphere.

As such, a plurality of laser light sources can cooperate to produce a pattern that covers a hemispherical field of view, allowing the distance sensor to calculate distances within a large range. However, if the beams projected by two or more different laser light sources overlap (e.g., as may happen when any of the fan angles are greater than ninety degrees), this can distort the appearance of the pattern to the detector and make it more difficult for the detector to determine from which laser light source a given artifact of the pattern was projected. This, in turn, may complicate the calculation of the distance and lead to longer calculation times and less accurate calculations.

Examples of the present disclosure provide a baffle to limit the fan angle of a plurality of beams projected by a laser light source of a three-dimensional distance sensor. By limiting the fan angle of the plurality of beams, the baffle makes it less likely that the plurality of beams will overlap with beams projected by other laser light sources of the distance sensor. This, in turn, makes it easier for the distance sensor to determine from which laser light source a given artifact in a projected pattern was projected.

Figure 2A:
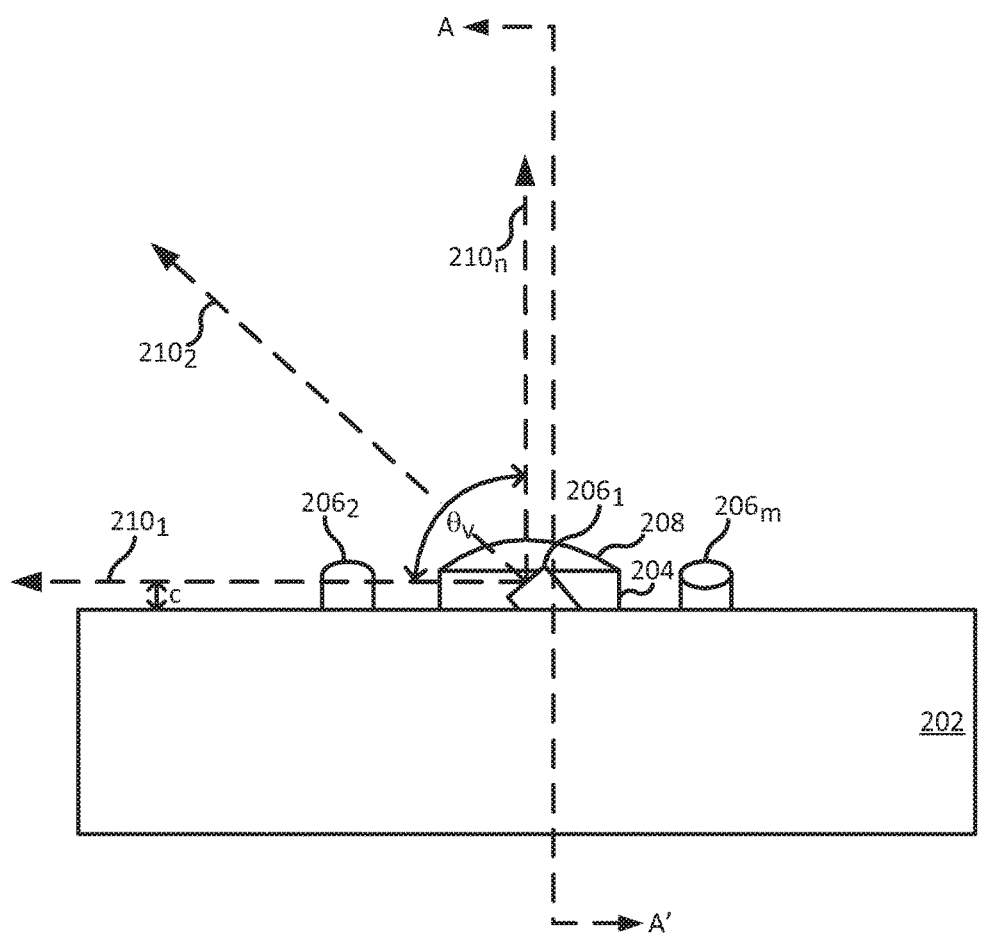
FIG. 2A illustrates a side view of an example distance sensor of the present disclosure.
Figure 2B:
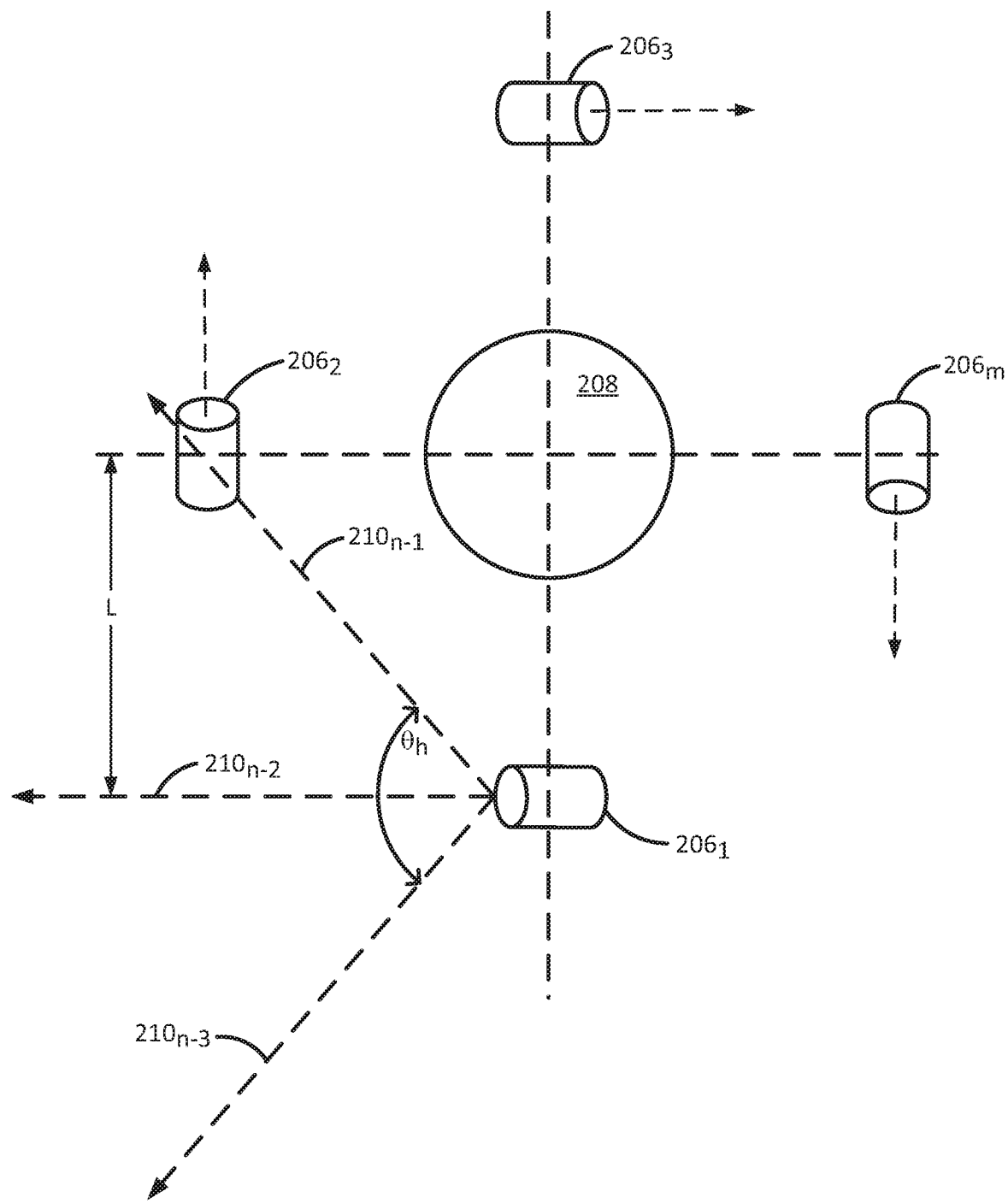
FIG. 2B illustrates a top view of the arrangement of components of the distance sensor illustrated in FIG. 2A.

FIG. 2A illustrates a side view of an example distance sensor 200 of the present disclosure. FIG. 2B illustrates a top view of the arrangement of components of the distance sensor 200 illustrated in FIG. 2A. The distance sensor 200 may generally include a housing 202, a camera 204, and a plurality of laser light sources $206_1$-$206_m$ (hereinafter individually referred to as a "laser light source 206" or collectively referred to as "laser light sources 206").

The housing 202 contains the components of the distance sensor 200 (i.e., the camera 204, the laser light sources 206, and other components not visible in FIGS. 2A and 2B such as a processor, a power supply, a communication interface, and the like). Optionally, the housing 202 may contain components of another system with which the distance sensor 200 works, such as the components of a robotic vacuum cleaner. The housing 202 may take other shapes or forms from that shown in FIGS. 2A and 2B.

The camera 204 may comprise any type of camera that is capable of capturing an image in a field of view. For instance, the camera may comprise a red, green, blue (RGB) camera. In one example, the camera may also include a lens 208 and a detector (not shown) that is capable of detecting light of a wavelength that is substantially invisible to the human eye (e.g., an infrared detector). In one example, the lens 208 may comprise a fisheye lens. In another example, however, the lens 208 may comprise a mirror optical system.

In one example, the plurality of laser light sources 206 is arranged around the camera 204 (e.g., in a circle), so that the camera 204 is positioned in the center of the laser light sources 206, equidistant from each laser light source 206. This arrangement is illustrated clearly in FIG. 2B. In one example, the distance sensor 200 includes at least four laser light sources 206 which are positioned at regular distances around the camera 204 (e.g., every ninety degrees). Assuming that the beams projected by each laser light source 206 have fan angles of ninety degrees, using four laser light sources 206 would allow the distance sensor 200 to project a pattern of light that covers a hemispherical field of view.

Each laser light source 206 may include a light emitting diode (LED) or other light source that is capable of emitting light in a wavelength that is substantially invisible to the human eye (e.g., infrared), but that is visible to a detector of the camera 204. Each laser light source 206 may also include a diffractive optical element that splits a beam emitted by the LED into a plurality of beams as shown in FIG. 1.

For instance, taking a first laser light source $206_1$ as an example (where each laser light source 206 functions in a manner similar to the first laser light source $206_1$), the laser light source $206_1$ may project a first plurality of beams $210_1$-$210_n$ (hereinafter individually referred to as a "beam 210" or collectively referred to as "beams 210") that fan out from a center point or beam 210. As discussed above, the beams 210 may fan out in multiple directions (e.g., between each pair of axes illustrated in FIG. 1). For instance, the beams 210 may fan out in the vertical direction (e.g., between the laser light source $206_1$ and the optical axis A-A' of the camera 204, or between the x and z axes or y and z axes of FIG. 1) and in the horizontal direction (e.g., around the optical axis A-A' of the camera 204, or between the x and y axes of FIG. 1).

For the sake of simplicity, three beams 210 of the first plurality of beams 210 forming a vertical fan out are illustrated in FIG. 2A: a first beam $210_1$ that represents a first outer boundary of the fan, a second beam $210_2$ that represents a center beam or center of the fan, and a third beam $210_n$ that represents a second outer boundary of the fan.

The "vertical" fan angle $\theta_v$ (i.e., the fan angle between the laser light source $206_1$ and the optical axis A-A' of the camera 204, or between the x and z axes or y and z axes of FIG. 1)) is defined between the outer boundaries of the fan, i.e., between the first beam $210_1$ and the third beam $210_n$. In one example, when the front nodal point of the camera lens 208 and the projection point of the laser light source $206_1$ (i.e., the point from which the plurality of beams 210 fans out) are at an even height (i.e., the height difference is zero or nearly zero), the vertical fan angle $\theta_v$ may be up to approximately ninety degrees.

Similarly, three beams 210 of the first plurality of beams 210 forming a horizontal fan out are illustrated in FIG. 2B: a fourth beam $210_{n-1}$ that represents a first outer boundary of the fan, a fifth beam $210_{n-2}$ that represents a center beam or center of the fan, and a sixth beam $210_{n-3}$ that represents a second outer boundary of the fan.

The "horizontal" fan angle $\theta_h$ (i.e., the fan angle around the optical axis A-A' of the camera 204, or between the x and y axes of FIG. 1) is defined between the outer boundaries of the fan, i.e., between the fourth beam $210_{n-1}$ and the sixth beam $210_{n-3}$, and in one example is up to approximately ninety degrees. Moreover, there is an area of clearance c between the surface of the housing 202 and the first beam $210_1$. Within this area of clearance c, the first plurality of beams 210 does not produce a projection artifact.

Figure 3:
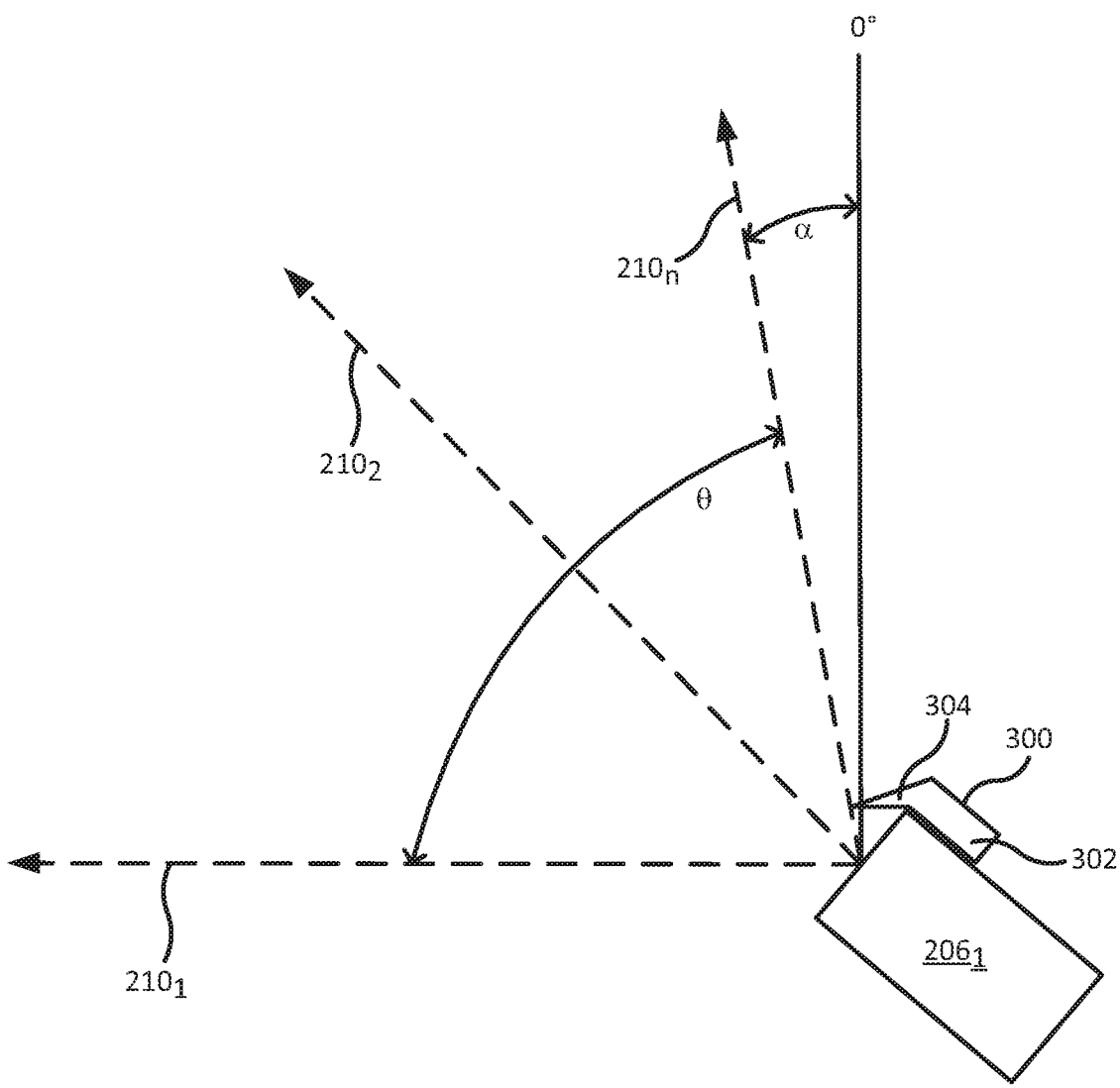
FIG. 3 illustrates a side view of one example of a baffle that may be used to limit the fan angle associated with a laser light source of FIG. 1.

In one example, one or more of the laser light sources 206 may include a baffle to limit the fan angle in one or more directions. FIG. 3, for example, illustrates a side view of one example of a baffle 300 that may be used to limit the fan angle associated with a laser light source $206_1$ of FIG. 1.

In one example, the baffle 300 may comprise a metal, plastic, glass, or ceramic component that may be removably attached to the laser light source $206_1$. As illustrated, the baffle 300 generally comprises a body 302 and a flange 304. The body 302 may attach to and rest substantially flush against the exterior surface of the laser light source $206_1$. The flange 304 may extend from the body 302 at an angle, so that when the baffle 300 is attached to the laser light source $206_1$, the flange 304 extends over a portion of the face of the laser light source $206_1$ from which the first plurality of beams 210 projects. As shown in FIG. 3, this placement of the baffle 300, and specifically of the flange 304, may decrease the fan angle θ of the first plurality of beams 210.

In one example, the baffle 300 may reduce the fan angle θ to sixty degrees or less. This may leave a space in the field of view, defined by an angle α between the outer boundary of the fan (e.g., third beam $210_n$) and a zero degree line that is parallel to the camera's optical axis, where there is no pattern coverage. That is, within the space defined by the angle α, no projection artifacts may be created when the laser light source $206_1$ projects the plurality of beams 210. However, the first plurality of beams 210 will not overlap with a second plurality of beams that is simultaneously projected from a second laser light source 206 of the distance sensor.

The baffle 300 is shown as extending around a portion of the laser light source's perimeter. This may reduce the fan angle θ in some directions, but not others. For instance, the baffle 300 may be positioned to reduce the vertical fan angle $\theta_v$, but not the horizontal fan angle $\theta_h$. As an example, the placement of the baffle may result in a horizontal fan angle $\theta_h$ of ninety degrees and a vertical fan angle $\theta_v$ of sixty degrees. However, it will be appreciated that in other examples, the baffle 300 may extend all the way around the laser light source's perimeter. This may further reduce the fan angle θ in all directions.

Although the baffle 300 creates areas in the pattern where there is no coverage (i.e., no projection artifacts in the field of view), it remains possible for the distance sensor to perform a trigonometric distance calculation with little to no loss of accuracy. This is in part because the baseline length, L (illustrated in FIG. 2B), for triangulation remains constant with respect to the projection angles of the laser light sources 206). In this case, the baseline length L may define the distance between any two projection points of the distance sensor 200. This also allows the distance sensor 200 to accurately calculate distance even when the fan outs of two separate pluralities of beams may overlap in the horizontal direction (e.g., around the camera's optical axis, or in a direction perpendicular to the camera's optical axis).

Figure 4:
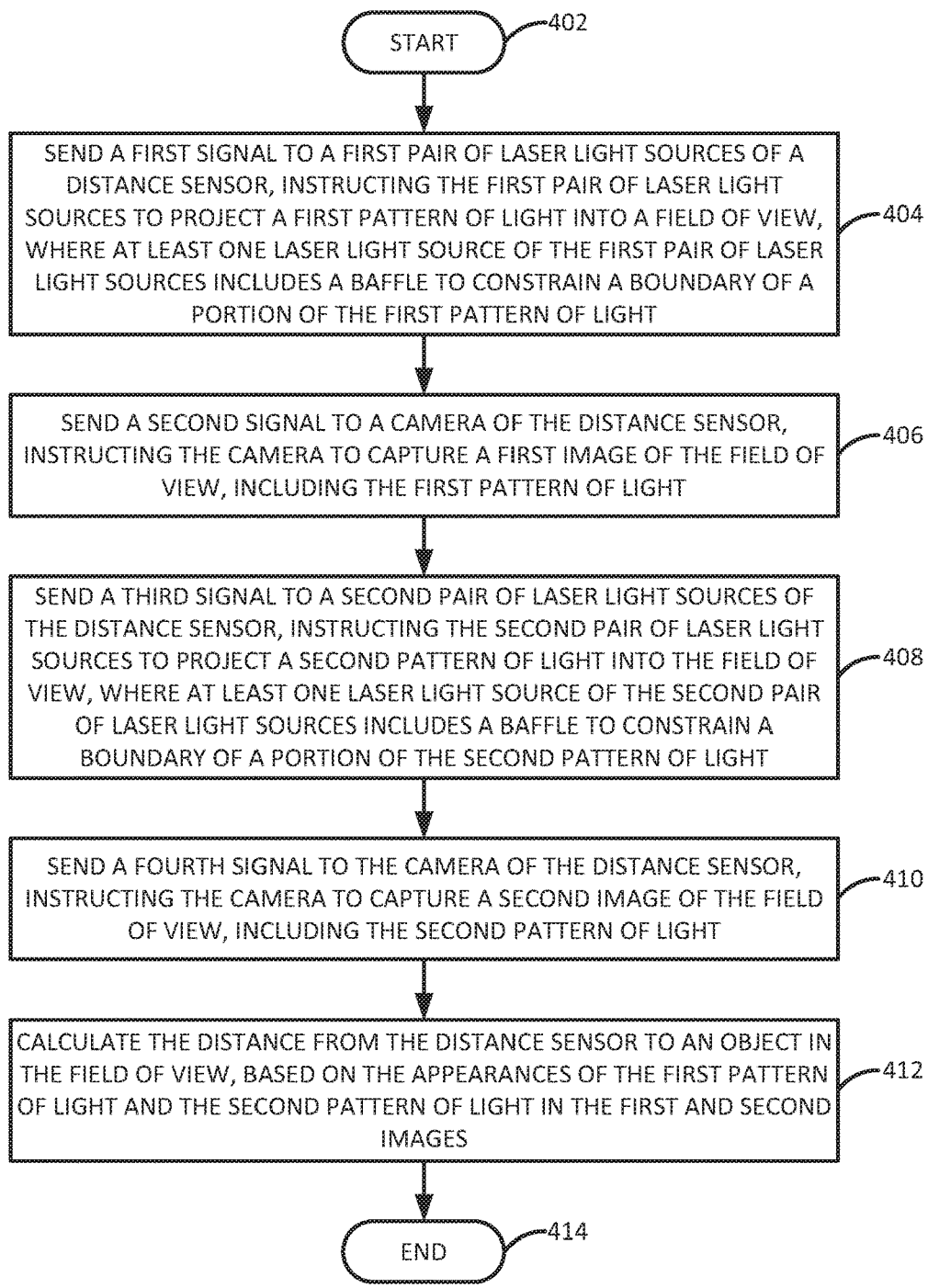
FIG. 4 is a flow diagram illustrating one example of a method for distance measurement using a distance sensor with a baffle attached to at least one light source.

FIG. 4 is a flow diagram illustrating one example of a method 400 for distance measurement using a distance sensor with a baffle attached to at least one light source, e.g., as illustrated in FIGS. 2-3. The method 400 may be performed, for example, by a processor, such as the processor of a distance sensor or the processor 702 illustrated in FIG. 7. For the sake of example, the method 400 is described as being performed by a processing system.

The method 400 may begin in step 402. In step 404, the processing system may send a first signal to a first pair of laser light sources of a distance sensor, instructing the first pair of laser light sources to project a first pattern of light into a field of view. In one example, the distance sensor includes four laser light sources, and the first pair of laser light sources comprises two laser light sources that are positioned on opposite sides of the lens of the distance sensor's camera (i.e., the laser light sources in the first pair of laser light sources are non-adjacent). For instance, using the distance sensor 200 of FIGS. 2A-2B as an example, the first pair of laser light sources might comprise laser light sources $206_1$ and $206_3$.

As discussed above, the first pattern of light may comprise a plurality of projection artifacts that is projected into the field of view. The projection artifacts may be created by respective beams of light that are incident on objects in the distance sensor's field of view, where each laser light source of the first pair of laser light sources projects a plurality of beams that fan out from a central projection point or beam. The wavelength of the light that forms the beams (and, therefore, the projection artifacts) may be substantially invisible to the human eye, but visible to a detector of the distance sensor's camera (e.g., infrared).

Furthermore, in one example, at least one laser light source in the first pair of laser light sources includes an attached baffle to constrain a boundary of the portion of the first pattern of light that is created by the at least one laser light source. The baffle may constrain the boundary by limiting a fan angle of the beams of light that are emitted by the at least one laser light source. For instance, the baffle may resemble the baffle 300 illustrated in FIG. 3. Limiting the fan angle may prevent the respective beams of light emitted by the two laser light sources in the first pair of laser light sources from overlapping.

Figure 5A:
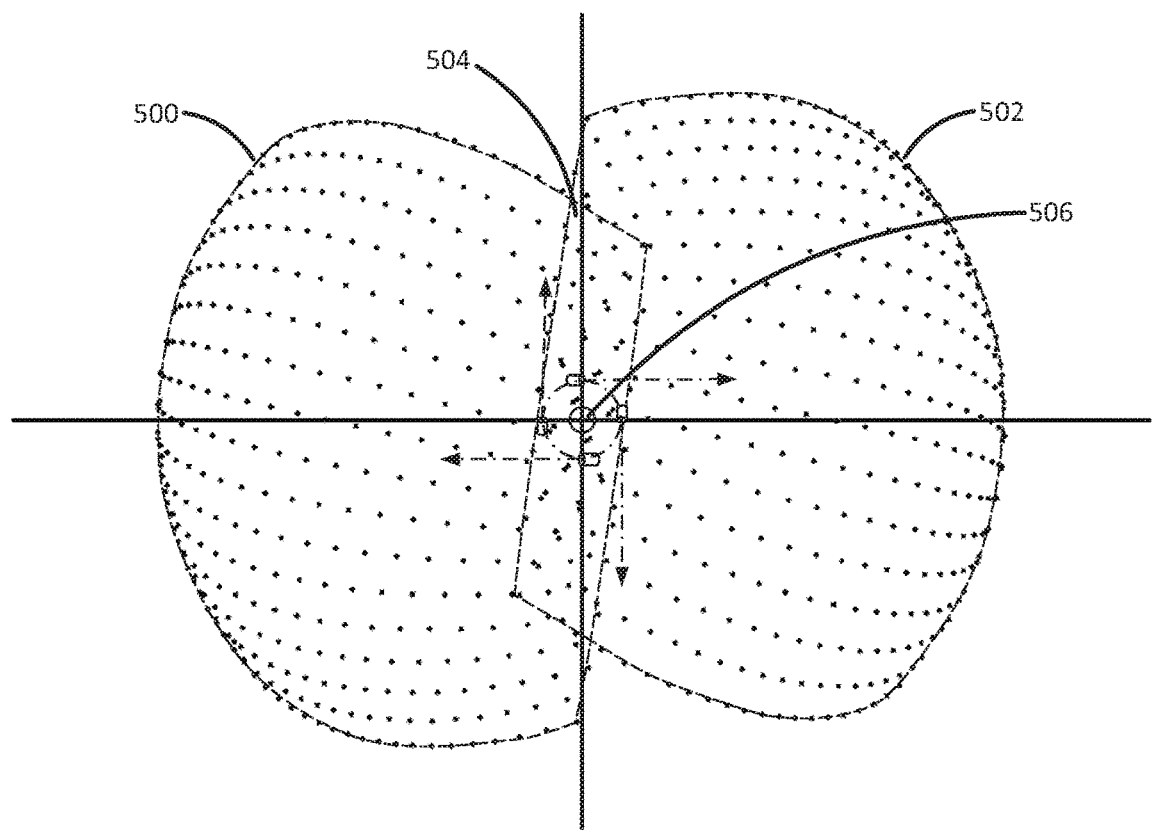
FIG. 5A illustrates a top view a first plurality of beams emitted by a first laser light source of a distance sensor and a second plurality of beams emitted by a second laser light source of the distance sensor, where the fan angles of the first and second pluralities of beams are not limited by a baffle.
Figure 5B:
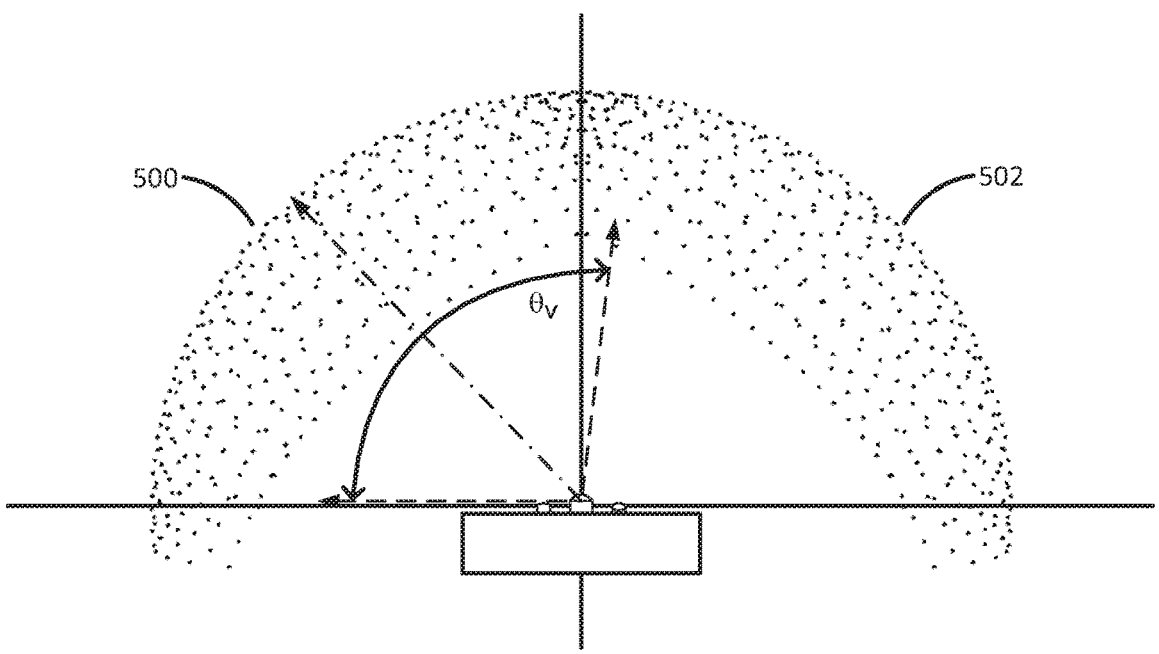
FIG. 5B illustrates a side view of the first plurality of beams and the second plurality of beams illustrated in FIG. 5A.

FIG. 5A, for instance, illustrates a top view a first plurality of beams 500 emitted by a first laser light source of a distance sensor and a second plurality of beams 502 emitted by a second laser light source of the distance sensor, where the fan angles of the first and second pluralities of beams are not limited by a baffle. FIG. 5B illustrates a side view of the first plurality of beams 500 and the second plurality of beams 502 illustrated in FIG. 5A. The pair of laser light sources projecting the first plurality of beams 500 and the second plurality of beams 502 are positioned on opposite sides of a camera lens 506 (i.e., are not adjacent).

As shown in FIGS. 5A and 5B, when a baffle is not used on at least one of the laser light sources, the first plurality of beams 500 and the second plurality of beams 502 may overlap, creating a region 504 in which it may be difficult for the distance sensor to discern the origins (emitting laser light sources) of the projection artifacts that are visible. This may occur when the vertical fan angle $\theta_v$ of one or both of the first and second pluralities of beams 500 and 502 is greater than ninety degrees.

Figure 6A:
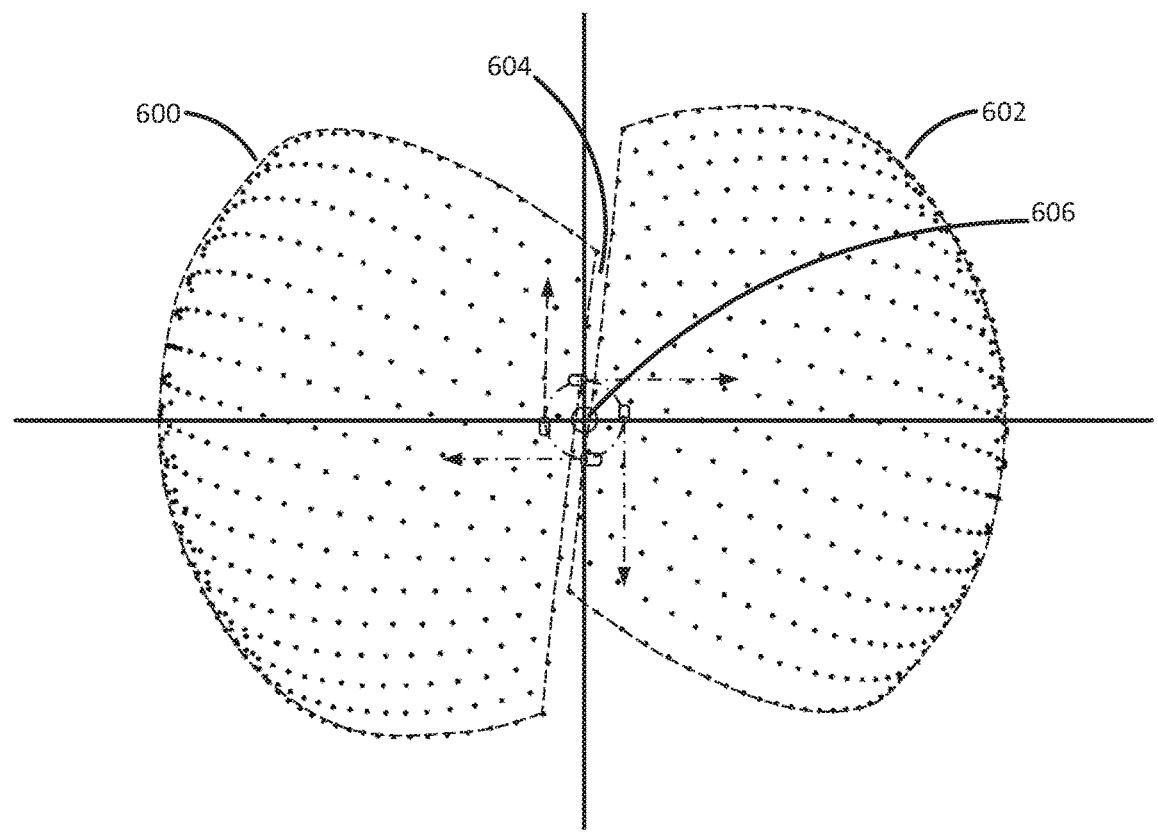
FIG. 6A illustrates a top view a first plurality of beams emitted by a first laser light source of a distance sensor and a second plurality of beams emitted by a second laser light source of the distance sensor, where the fan angles of the first and second pluralities of beams are limited by a baffle.
Figure 6B:
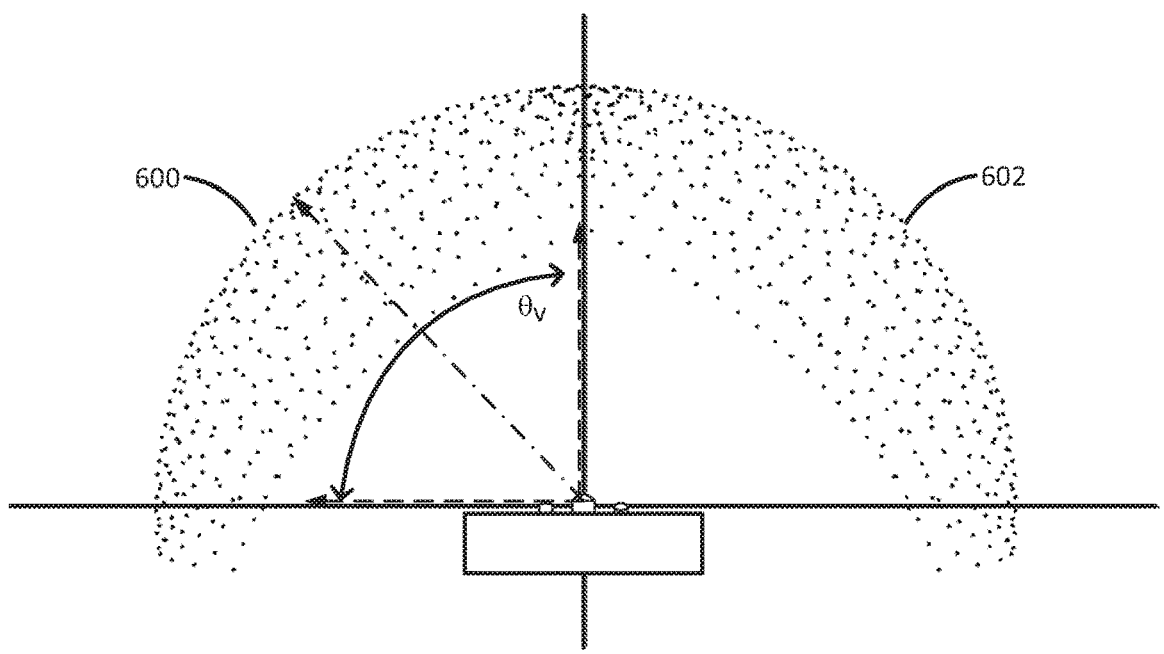
FIG. 6B illustrates a side view of the first plurality of beams and the second plurality of beams illustrated in FIG. 6A.

By contrast, FIG. 6A illustrates a top view a first plurality of beams 600 emitted by a first laser light source of a distance sensor and a second plurality of beams 602 emitted by a second laser light source of the distance sensor, where the fan angles of the first and second pluralities of beams are limited by a baffle. FIG. 6B illustrates a side view of the first plurality of beams 600 and the second plurality of beams 602 illustrated in FIG. 6A. The pair of laser light sources projecting the first plurality of beams 600 and the second plurality of beams 602 are positioned on opposite sides of a camera lens 606 (i.e., are not adjacent).

As shown in FIGS. 6A and 6B, when a baffle is used on at least one of the laser light sources, the first plurality of beams 600 and the second plurality of beams 602 will not overlap. This may create a region 604 in which no projection artifacts are visible (e.g., there is no pattern coverage). However, the loss of pattern coverage in this small area should not substantially affect the accuracy of any distance calculations. As illustrated, the vertical fan angle $\theta_v$ of one or both of the first and second pluralities of beams 600 and 602 is no more than ninety degrees.

Referring back to FIG. 4, once the first pair of laser light sources projects the first pattern of light into the field of view, the method proceeds to step 406. In step 406, the processing system may send a second signal to the camera of the distance sensor instructing the camera to capture a first image of the field of view, including the first pattern of light projected by the first pair of laser light sources.

In step 408, the processing system may send a third signal to a second pair of laser light sources of the distance sensor to project a second pattern of light into a field of view. In the example in which the distance sensor includes four laser light sources, the second pair of laser light sources may comprise two laser light sources that are positioned on opposite sides of the lens of the distance sensor's camera (i.e., the laser light sources in the second pair of laser light sources are non-adjacent). For instance, using the distance sensor 200 of FIGS. 2A-2B as an example, if the first pair of laser light sources referenced above comprise laser light sources $206_1$ and $206_3$, then the second pair of laser light sources might comprise laser light sources $206_2$ and $206_n$.

As discussed above, the second pattern of light, like the first pattern of light, may comprise a plurality of projection artifacts that is projected into the field of view. The projection artifacts may be created by respective beams of light that are incident on objects in the distance sensor's field of view, where each laser light source of the second pair of laser light sources projects a plurality of beams that fan out from a central projection point or beam. The wavelength of the light that forms the beams (and, therefore, the projection artifacts) may be substantially invisible to the human eye, but visible to a detector of the distance sensor's camera (e.g., infrared).

Furthermore, in one example, at least one laser light source in the second pair of laser light sources includes an attached baffle to constrain a boundary of the portion of the second pattern of light that is created by the at least one laser light source. The baffle may constrain the boundary by limiting a fan angle of the beams of light that are emitted by the at least one laser light source. For instance, the baffle may resemble the baffle 300 illustrated in FIG. 3. Limiting the fan angle may prevent the respective beams of light emitted by the two laser light sources in the second pair of laser light sources from overlapping, as discussed above.

In one example, the processing system does not send the third signal to the second pair of laser light sources until after the camera has captured the first image. This ensures that the first pair of laser light sources and the second pair of laser light sources do not project the first and second patterns of light simultaneously. In other words, the first pair of laser light sources and the second pair of laser light sources project their respective patterns of light in sequence, on after the other. Thus, at any time, only half of the hemispherical field of view may be covered by a projection pattern. Put another way, the first pattern of light covers (up to) a first half of the distance sensor's hemispherical field of view, while the second pattern of light covers (up to) a different, second half of the field of view. This further avoids the potential for beam overlap.

In step 410, the processing system may send a fourth signal to the camera of the distance sensor instructing the camera to capture a second image of the field of view, including the second pattern of light projected by the second pair of laser light sources.

In step 412, the processing system may calculate the distance from the distance sensor to an object in the camera's field of view, using the first and second images captured in steps 406 and 410. In particular, the distance is calculated based on the appearances of the first pattern of light and the second pattern of light in the first image and the second image, respectively.

The method 400 may end in step 414.

It should be noted that although not explicitly specified, some of the blocks, functions, or operations of the method 400 described above may include storing, displaying and/or outputting for a particular application. In other words, any data, records, fields, and/or intermediate results discussed in the method 400 can be stored, displayed, and/or outputted to another device depending on the particular application. Furthermore, blocks, functions, or operations in FIG. 4 that recite a determining operation, or involve a decision, do not imply that both branches of the determining operation are practiced. In other words, one of the branches of the determining operation may not be performed, depending on the results of the determining operation.

Figure 7:
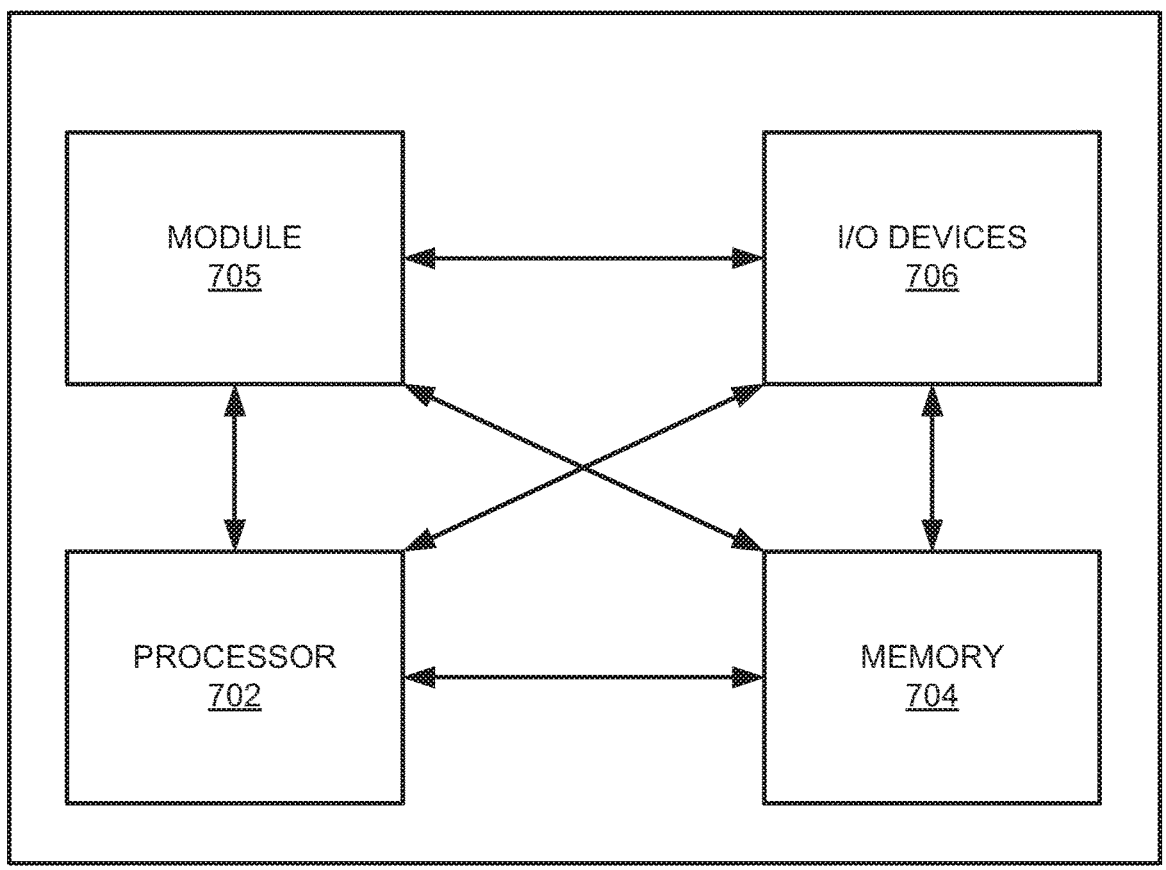
FIG. 7 depicts a high-level block diagram of an example electronic device for calculating the distance from a sensor to an object.

FIG. 7 depicts a high-level block diagram of an example electronic device 700 for calculating the distance from a sensor to an object. As such, the electronic device 700 may be implemented as a processor of an electronic device or system, such as a distance sensor.

As depicted in FIG. 7, the electronic device 700 comprises a hardware processor element 702, e.g., a central processing unit (CPU), a microprocessor, or a multi-core processor, a memory 704, e.g., random access memory (RAM) and/or read only memory (ROM), a module 705 for calculating the distance from a sensor to an object, and various input/output devices 706, e.g., storage devices, including but not limited to, a tape drive, a floppy drive, a hard disk drive or a compact disk drive, a receiver, a transmitter, a display, an output port, an input port, and a user input device, such as a keyboard, a keypad, a mouse, a microphone, a camera, a laser light source, an LED light source, and the like.

Although one processor element is shown, it should be noted that the electronic device 700 may employ a plurality of processor elements. Furthermore, although one electronic device 700 is shown in the figure, if the method(s) as discussed above is implemented in a distributed or parallel manner for a particular illustrative example, i.e., the blocks of the above method(s) or the entire method(s) are implemented across multiple or parallel electronic devices, then the electronic device 700 of this figure is intended to represent each of those multiple electronic devices.

It should be noted that the present disclosure can be implemented by machine readable instructions and/or in a combination of machine readable instructions and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s) discussed above can be used to configure a hardware processor to perform the blocks, functions and/or operations of the above disclosed method(s).

In one example, instructions and data for the present module or process 705 for calculating the distance from a sensor to an object, e.g., machine readable instructions can be loaded into memory 704 and executed by hardware processor element 702 to implement the blocks, functions or operations as discussed above in connection with the method 400. Furthermore, when a hardware processor executes instructions to perform "operations", this could include the hardware processor performing the operations directly and/or facilitating, directing, or cooperating with another hardware device or component, e.g., a co-processor and the like, to perform the operations.

The processor executing the machine readable instructions relating to the above described method(s) can be perceived as a programmed processor or a specialized processor. As such, the present module 705 for calculating the distance from a sensor to an object of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or an electronic device such as a computer or a controller of a safety sensor system.

It will be appreciated that variants of the above-disclosed and other features and functions, or alternatives thereof, may be combined into many other different systems or applications. Various presently unforeseen or unanticipated alternatives, modifications, or variations therein may be subsequently made which are also intended to be encompassed by the following claims.

What is claimed is:

1. A distance sensor, comprising:
   a camera to capture images of a field of view;
   a plurality of light sources arranged around a lens of the camera, wherein each light source of the plurality of light sources is configured to project a plurality of beams of light into the field of view, and wherein the plurality of beams of light creates a pattern of projection artifacts in the field of view that is visible to a detector of the camera;
   a baffle attached to a first light source of the plurality of light sources, wherein the baffle is positioned to limit a fan angle of a plurality of beams of light that is projected by the first light source, wherein the baffle comprises:
      a body that attaches to an exterior surface of the first light source; and
      a flange that extends from the body at an angle and over a portion of a face of the first light source; and
   a processor to calculate a distance from the distance sensor to an object in the field of view, based on an analysis of the images.

2. The distance sensor of claim 1, wherein the plurality of light sources comprises four light sources.

3. The distance sensor of claim 1, wherein a wavelength of the plurality of beams is invisible to a human eye, but visible to a detector of the camera.

4. The distance sensor of claim 1, wherein each light source of the plurality of light sources is positioned an equal distance from the camera.

5. The distance sensor of claim 1, wherein the baffle is positioned to limit the fan angle between the light source and an optical axis of the camera.

6. The distance sensor of claim 1, wherein the baffle limits the fan angle to no more than ninety degrees.

7. The distance sensor of claim 6, wherein the baffle limits the fan angle to no more than sixty degrees.

8. The distance sensor of claim 1, wherein projection points of the plurality of light sources are at an even height with a front nodal point of the lens.

9. The distance sensor of claim 1, wherein the fan angle defines the boundaries of the plurality of beams of light that is projected by the first light source.

10. A method, comprising:
    instructing, by a processing system of a distance sensor, a first pair of light sources of the distance sensor to project a first pattern of light into a field of view, wherein the first pattern of light is created when each light source of the first pair of light sources projects a plurality of beams of light, and wherein at least one light source of the first pair of light sources includes a first baffle to limit a fan angle of the plurality of beams of light, wherein the first baffle comprises:
       a first body that attaches to an exterior surface of the at least one light source of the first pair of light sources; and
       a first flange that extends from the first body at an angle and over a portion of a face of the at least one light source of the first pair of light sources;
    instructing, by the processing system, a camera of the distance sensor to acquire a first image of the field of view, wherein the first image includes the first pattern of light; instructing, by the processing system, a second pair of light sources of the distance sensor to project a second pattern of light into the field of view, wherein the second pattern of light is created when each light source of the second pair of light sources projects a plurality of beams of light, and wherein at least one light source of the second pair of light sources includes a second baffle to limit a fan angle of the plurality of beams of light, wherein the second baffle comprises:

a second body that attaches to an exterior surface of the at least one light source of the second pair of light sources; and a second flange that extends from the second body at an angle and over a portion of a face of the at least one light source of the second pair of light sources;

instructing, by the processing system, the camera to acquire a second image of the field of view, wherein the second image includes the second pattern of light; and calculating, by the processing system, a distance from the distance sensor to an object in the field of view, based on appearances of the first pattern of light and the second pattern of light in the first image and the second image.

11. The method of claim 10, wherein the first pattern of light and the second pattern of light each comprise a plurality of projection artifacts, and wherein the plurality of projection artifacts is invisible to a human eye, but visible to a detector of the camera.

12. The method of claim 10, wherein light sources of the first pair of light sources are positioned on opposite sides of a lens of the camera, and wherein light sources of the second pair of light sources are positioned on opposite sides of a lens of the camera.

13. The method of claim 12, wherein the first pattern of light and the second pattern of light are projected into different areas of the field of view.

14. The method of claim 13, where processing system instructs the second pair of light sources to project the second pattern of light into the field of view after the camera has acquired the first image of the field of view.

15. The method of claim 10, wherein the first baffle is positioned to limit the fan angle between the at least one light source of the first pair of light sources and an optical axis of the camera.

16. The method of claim 10, wherein the first baffle limits the fan angle of the plurality of beams of light projected by the at least one light source to no more than ninety degrees.

17. The method of claim 10, wherein the first baffle limits the fan angle of the plurality of beams of light projected by the at least one light source to no more than sixty degrees.

18. The method of claim 10, wherein the first pair of light sources and the second pair of light sources collectively comprise four light sources that are arranged around a lens of the camera.

19. The method of claim 18, wherein each light source of the first pair of light sources and the second pair of light sources is positioned an equal distance from the lens.

20. A non-transitory machine-readable storage medium encoded with instructions executable by a processor of a distance sensor, wherein, when executed, the instructions cause the processor to perform operations, the operations comprising:

instructing a first pair of light sources of the distance sensor to project a first pattern of light into a field of view, wherein the first pattern of light is created when each light source of the first pair of light sources projects a plurality of beams of light, and wherein at least one light source of the first pair of light sources includes a baffle to limit a fan angle of the plurality of beams of light, wherein the first baffle comprises:

a first body that attaches to an exterior surface of the at least one light source of the first pair of light sources; and a first flange that extends from the first body at an angle and over a portion of a face of the at least one light source of the first pair of light sources;

instructing a camera of the distance sensor to acquire a first image of the field of view, wherein the first image includes the first pattern of light;

instructing a second pair of light sources of the distance sensor to project a second pattern of light into the field of view, wherein the second pattern of light is created when each light source of the second pair of light sources projects a plurality of beams of light, and wherein at least one light source of the second pair of light sources includes a baffle to limit a fan angle of the plurality of beams of light, wherein the second baffle comprises:

a second body that attaches to an exterior surface of the at least one light source of the second pair of light sources; and a second flange that extends from the second body at an angle and over a portion of a face of the at least one light source of the second pair of light sources;

instructing the camera to acquire a second image of the field of view, wherein the second image includes the second pattern of light; and calculating a distance from the distance sensor to an object in the field of view, based on appearances of the first pattern of light and the second pattern of light in the first image and the second image.

* * * * *